(12) United States Patent
Coon et al.

(10) Patent No.: US 7,685,403 B1
(45) Date of Patent: *Mar. 23, 2010

(54) PIPELINE REPLAY SUPPORT FOR MULTI-CYCLE OPERATIONS

(76) Inventors: Brett Coon, 2339 Pinard St., Milpitas, CA (US) 95035; Godfrey D'Souza, 298 S. 12th St., San Jose, CA (US) 95112; Paul Serris, 661 San Diego Ave., Sunnyvale, CA (US) 94086

( * ) Notice: Subject to any disclaimer, the term of this patent is extended or adjusted under 35 U.S.C. 154(b) by 116 days.

This patent is subject to a terminal disclaimer.

(21) Appl. No.: 10/463,820

(22) Filed: Jun. 16, 2003

Related U.S. Application Data

(63) Continuation of application No. 09/421,972, filed on Oct. 20, 1999, now Pat. No. 6,604,188.

(51) Int. Cl.
*G06F 15/00* (2006.01)
(52) U.S. Cl. .......................................... 712/24; 712/215
(58) Field of Classification Search .................... 712/24, 712/215
See application file for complete search history.

(56) References Cited

U.S. PATENT DOCUMENTS

| | | | |
|---|---|---|---|
| 4,439,828 A | 3/1984 | Martin | |
| 4,679,194 A | 7/1987 | Peters et al. | |
| 5,136,696 A * | 8/1992 | Beckwith et al. | 712/240 |
| 5,325,495 A * | 6/1994 | McLellan | 712/219 |
| 5,414,853 A | 5/1995 | Fertig et al. | |
| 5,418,970 A | 5/1995 | Gifford | |
| 5,475,852 A | 12/1995 | Yoshida et al. | |
| 5,555,429 A | 9/1996 | Parkinson et al. | |
| 5,644,742 A * | 7/1997 | Shen et al. | 712/244 |
| 5,748,951 A | 5/1998 | Webb et al. | |
| 5,761,466 A * | 6/1998 | Chau | 712/200 |
| 5,778,211 A | 7/1998 | Hohensee et al. | |
| 5,778,219 A | 7/1998 | Amerson et al. | |
| 5,778,423 A | 7/1998 | Sites et al. | |
| 5,790,844 A | 8/1998 | Webb et al. | |
| 5,799,165 A * | 8/1998 | Favor et al. | 712/214 |

(Continued)

OTHER PUBLICATIONS

Hennessy et al., Computer Architecture A Quantitative Approach, 1996, Morgan Kauffman Publishers, Inc., 2nd Ed., pp. 130, 284-289.*

(Continued)

*Primary Examiner*—Alford W Kindred
*Assistant Examiner*—Benjamin Geib

(57) ABSTRACT

Instructions asserted in the instruction pipeline (3) of the microprocessor are accompanied by control information, comprising a group of bits, asserted within a control information pipeline (15) of the processor. The control information pipeline is synchronized to the instruction pipeline so that the control information for an instruction progresses in synchronism with the instruction. The control information may identify, directly or indirectly, the type of operation called for by the instruction and, if the operation is to be performed in parts, indicate the part to be performed. Means are included in to the processor, such as a number of functional execution units (7), to interpret that control information and take appropriate action. Applied in a VLIW processor to an atom operation that requires multiple cycles to complete, in which the first part of the operation is permitted to complete and the atom then reasserted, the control information identifies the second assertion of the atom as the second part of a multi-cycle operation.

32 Claims, 2 Drawing Sheets

U.S. PATENT DOCUMENTS

| | | | |
|---|---|---|---|
| 5,832,202 A | 11/1998 | Slavenburg et al. |
| 5,854,914 A | 12/1998 | Bodas et al. |
| 6,021,488 A | 2/2000 | Eisen et al. |
| 6,041,399 A | 3/2000 | Terada et al. |
| 6,047,120 A | 4/2000 | Bell |
| 6,058,420 A | 5/2000 | Davies |
| 6,112,297 A | 8/2000 | Ray et al. |
| 6,151,669 A | 11/2000 | Huck et al. |
| 6,185,668 B1 | 2/2001 | Arya |
| 6,223,278 B1 | 4/2001 | Morrison |
| 6,243,786 B1 | 6/2001 | Huang et al. |
| 6,295,601 B1 | 9/2001 | Steele, Jr. |
| 6,336,212 B1 | 1/2002 | Gray et al. |
| 6,370,639 B1 | 4/2002 | Huck et al. |
| 6,604,188 B1 | 8/2003 | Coon et al. |
| 6,728,865 B1 | 4/2004 | Coon et al. |
| 7,134,001 B1 | 11/2006 | Coon et al. |
| 7,219,335 B1 | 5/2007 | Moas et al. |

OTHER PUBLICATIONS

Ozer et al., A Fast Interrupt Handling Scheme for VLIW Processors, Oct. 12-18, 1998, Proceedings of International conference on Parallel Architectures and Compilation Techniques, pp. 136-141.

Patterson et al.; "Computer Architecture a Quantitative Approach"; Morgan Kaufmann Publishers, Inc.; 2nd Edition, San Francisco, CA; 1990.

Non-Final Office Action dated Apr. 11, 2002; U.S. Appl. No. 09/421,972.

Notice of Allowance dated Oct. 31, 2002; U.S. Appl. No. 09/421,972.

* cited by examiner

PIPELINE REPLAY SUPPORT FOR MULTI-CYCLE OPERATIONS

This is a continuation of application Ser. No. 09/421,972 filed on Oct. 20, 1999 now U.S. Pat. No. 6,604,188 which is hereby incorporated by reference to this specification which designated the U.S.

REFERENCE TO RELATED APPLICATIONS

This application is related to, and claims the benefit of 35 USC 120 with respect to, U.S. Pat. No. 6,738,892 entitled Use of Enable Bits to Control Execution of Selected Instructions, by Coon et al., and U.S. Pat. No. 6,728,865 entitled Pipeline Replay Support for Unaligned Memory Operations, by Coon et al.

FIELD OF THE INVENTION

The present invention relates to digital computers, and, more particularly, to a novel method and apparatus for reducing complexity of the logic circuits required to handle multi-cycle operations.

BACKGROUND

The operation of a digital computer is controlled by computer programs, such as operating systems and application programs. Those programs provide instructions to those functional units of a central processor in the digital computer responsible for handling and execution as binary information. Different binary sequences represent different instructions for a particular machine and the instructions tend to be unique to a particular processor or processor family. Thus, typically, different families of processors have different instruction sets, unless they are specifically designed to utilize an instruction set of another processor family.

The instructions of one processor typically cannot be understood directly by any of the other types of processors. The difference in instruction sets is often due to the format chosen by the designer for presenting instructions to the processor. In general, a designer may chose to design a processor for a complex instruction set computer (CISC) or reduced instruction set computer (RISC) or for a newer very long instruction set (VLIW) computer.

CISC processors provide special hardware for executing an entire operation. For example, an ADD instruction may provide one operand to an integer unit register, fetch a second operand from memory and place it in a second register, and combine the two operands in a third register. Because it does so, instruction formats are very complicated. Such structure takes a large amount of hardware and processing effort to tell one instruction from another. A RISC processor, on the other hand, is much simpler and treats each part of an ADD operation as a separate element. By providing consistently sized instructions, a RISC processor eliminates significant hardware and reduces the processing time needed to decode instructions.

A newer type of processor called a very long instruction word (VLIW) processor attempts to make use of the best attributes of both CISC and RISC.

It uses consistent sized instructions (herein called "atoms") as do RISC processors, but groups a number of those instructions together in a VLIW word (herein called a "molecule") and provides processing units to execute the individual atoms in parallel.

The execution of most operations by a processor requires a number of steps. For example, instructions must be fetched from memory, sometimes a second instruction must be fetched from memory, the instruction is decoded and finally it is executed. This takes a number of operational cycles of the processor. In order to produce results as fast as possible, computers are designed so that each sequential instruction is begun (as far as is possible) on the next operation cycle after the preceding instruction has already begun the steps leading to its execution. This causes the steps leading to execution of subsequent instructions to overlap. In this manner, an instruction may often be executed each cycle.

The manner in which this starting and carrying out the steps leading to the execution of instructions so that an instruction executes each operation cycle is referred to by those skilled in the art as an instruction pipeline, which is included within processors. In operation to process an application program, the instructions of the application are serially entered into the pipeline by a pipeline control unit. The pipeline control unit includes a program counter, that loads instructions in a serial order into the pipeline. Via that pipeline, instructions are presented to a respective functional execution unit of the processor that is to execute the instruction.

Instructions do not always execute in the ideal order provided by the pipeline. Often things happen which interfere with the process. For example, a memory page at which an instruction resides may not be in main memory and must be paged in before the instruction can execute. Exceptions occur for a wide variety of reasons. When such exception occurs, further internal processing activity of the application program is temporarily halted, until that exception is resolved. The excepting functional unit issues a stop signal, herein called a "kill" signal, which pauses all other functional units in the microprocessor, until the exception is resolved, empties the pipeline of any instructions and immediately prompts an exception handler into action.

The exception handler fixes the problem which has arisen. An exception handler is a software routine conventionally designed to deal with such exceptions; and different exception handlers exist to handle each different kind of exception. A different routine is prepared to handle different exceptions. Thus, every computer contains a library of such software handlers in its associated memory. The pipeline control unit calls up an appropriate exception handler and executes that routine.

As an example, if a memory exception is due to the failure to locate data referenced by a load instruction within main memory, the exception handler is one that pages in that data and then returns back to the original excepted instruction. Processing of the application recommences with re-execution of the same instruction. However, this time the instruction is executed without generating that memory exception. In rare instances an exception handler of a RISC or CISC processors may emulate the instruction that caused the exception and then execute the emulated instruction to achieve the result desired. In other instances, an exception handler may only note that an exception occurred and return control to the excepted instruction or may decide to skip the excepted instruction and have execution resume at the next instruction. The exception handler thereafter returns control to the instruction pipeline controller by issuing a "return-from-exception" (RFE) signal. The latter signals the pipeline counter in the pipeline control unit to reissue and execute the instruction that was subject to the exception or, alternatively as called for by the exception handler, signals to advance the next instruction into the pipeline, that is, insert the memory address of the succeeding instruction into the pipeline, thereby moving pipeline activity beyond the instruction that generated the exception. In either event, the return-from-exception procedure is a very simple step.

Such a simple step of skipping past an excepted instruction is not possible for VLIW processors. In VLIW processors it is frequently desired for exception handlers to emulate an excepting atom instruction. Although re-execution of the excepting atom instruction is not desired, other atoms in the same molecule instruction must be executed. For example, one VLIW computer system is described U.S. Pat. No. 5,832, 205 to Kelly et al, granted Nov. 3, 1998, entitled, Memory Controller For A Microprocessor For Detecting A Failure of Speculation On The Physical Nature of A Component Being Addressed (the '205 Kelly patent), assigned to Transmeta Corporation, assignee of the present invention, the content of which is incorporated by reference herein in its entirety. The present invention has particular application to VLIW computers, and, in particular, to VLIW computers described by the '205 Kelly patent, although it should be understood that the invention may be found to also be applicable to other types of computers.

The '205 Kelly patent discloses a novel microprocessor formed by a combination of a hardware processing portion, much simpler in structure than competitive prior state of the art microprocessors, and an emulating software portion, referred to therein as "code morphing software". Among other things, in the Kelly system the code morphing software carries out a significant portion of the functions of processors in software, thereby reducing the hardware required for processing and the greater electrical power that such hardware requires. For a better understanding of the foregoing and other functions accomplished by the code morphing software, the interested reader is invited to study the '205 Kelly patent.

A VLIW processor constructed in accordance with the '205 Kelly patent also contains an instruction pipeline. However, because a VLIW instruction ("molecule") is packed with a number of individual instructions ("atoms"), which are to be executed in parallel, what is generally referred to as the instruction pipeline in a processor prescribed in the '205 Kelly patent is actually a composite of multiple parallel pipelines. The stages of the instruction pipeline in the latter processor number, typically, five. Those stages comprise, as an example, first and second fetches (from memory), two register operations and, ultimately, the execution stage, at which an instruction is executed (or is found subject to an exception).

The pipeline formatting of a molecule rarely contains a single atom prescribing an operation, but, typically, comprises two and as many as four separate atoms prescribing different operations. Those atoms pass along the instruction pipeline as a collective group constituting the molecule. Since individual atoms are intended to be executed by separate functional execution units and such execution is intended to occur in parallel, i.e., simultaneously, the VLIW processor comprises multiple instruction pipelines, one for each functional unit in the computer that may be called upon during the processing steps to execute atom instructions. In making reference herein to the pipeline of a VLIW processor, it should be understood that reference is being made collectively to the multiple pipelines, unless the context of the statement indicates that reference is made only to a specific individual pipeline, as an example, to the memory pipeline, the ALU1 pipeline and so on.

At the execution stage of the respective pipeline, the atomic instructions are executed by separate non-conflicting functional units in the computer, ideally, concurrently for optimal speed of processing. If execution of one of those component instructions causes an exception, which, as a consequence, halts further processing and forces clearance of the instruction pipeline, as many as three atomic instructions in the VLIW molecule are also halted and cleared from their respective instruction pipelines.

In VLIW computers an exception handler cannot simply emulate the one atom responsible for the exception and advance the pipeline control unit instruction counter another step, as occurs in the prior CISC computers earlier described, since the remaining operation atoms in the same molecule also must be accounted for and require execution. Instead the VLIW computers exception handlers are required to either emulate all the atoms in the molecule before returning control back to the pipeline control unit or otherwise store, retrieve and execute those remaining atoms.

The foregoing exception handling process is very expensive in terms of VLIW processor time (clock cycles) and is likely to dramatically slow execution of the program. It also requires the software comprising the exception handlers to be significantly more complex than that for the CISC type processors. Neither result is attractive. Both detract from inherent advantage of the VLIW processor.

In my copending application entitled PIPELINE ENABLE BITS, S.N. filed of even date herewith, the content of which is incorporated by reference in its entirety, I disclose an improvement, applicable to a VLIW computer and possibly to other computers as well, through which control information, a group of bits, therein referred to as enable bits, is linked to the molecule, and each of those bits pertains to a respective one of the individual atom instructions within a molecule. Those bits help processing by indicating whether the associated atom is to be executed or not when the instruction is present at the execution stage of the pipeline. The execution units interpret those bits and execute the instruction (or not) accordingly.

As the molecule progresses through the instruction pipeline, stage by stage, that control information also progresses along what is therein referred to as a control information pipeline, also containing multiple stages, in synchronism with the progress of the molecule through the instruction pipeline. At the execution stage, both the control information and the individual atoms of the molecule are presented in parallel to respective execution units for those atoms. Each execution unit checks the information pipeline for information pertinent to the respective atom presented for execution, prior to any execution.

In a specific embodiment described in that application, the VLIW computer referred to therein contained four functional units responsible for execution of atoms. One enable bit is included for each of those four execution units and the four bits in parallel defines the information packet.

By default all enable bits are set ("1") when the molecule is first introduced to the instruction pipeline. When the atoms in the molecule are presented again for execution, the respective functional unit first checks to ensure the one (of the four) enable bits relevant to the functional unit (pertaining to the respective atom) is set. If disabled ("0"), the functional unit does not execute the respective atom. If set, the functional unit executes the atom. Alternatively, the execution unit determines that the atom is subject to an exception, in which case an exception is taken. That action is communicated to the pipeline control unit. With an exception, the functional unit issues a "global kill" signal to clear the instruction pipeline of all atoms awaiting execution, including the atom responsible for the exception, and pauses all other operations.

Responding to an exception, the pipeline control unit saves the VLIW instruction address (which, as later herein described, permits the instruction to later be reasserted in the pipeline) and also saves the accompanying packet of enable bits, placing those bits within a register, therein called the error register, and selects and calls up exception handler software.

The exception handler handles the exception and then issues a return-from-exception to the pipeline control unit. Prior to issuing the return-from-exception to the pipeline control unit, the handler (if required for by its design) also writes to the aforementioned error register and disables the enable bit associated with the atom responsible for the exception.

Upon the return-from-exception, the pipeline control unit reasserts the same VLIW instruction (address) in the instruction pipeline together with the packet of enable bits. The pipeline control unit retrieves that packet from the error register, where temporarily stored, and transfers that data into the respective control information pipeline. Since the enable bit associated with the atom that was responsible for the exception is now disabled ("0"), that atom cannot be executed when the molecule again reaches the pipeline execution stage. The remaining atoms in the molecule for which the associated enable bits remain set ("1") are able to be executed (or, when checked, may also be found subject to an exception, in which case the procedure is repeated for such atom).

If for a particular type of exception, the exception handler resolves the exception without necessitating disablement of the atom that produced the exception, when the molecule is reasserted in the instruction pipeline, as above described, that atom now executes, since the exception handler already resolved the condition that initially caused the exception.

The foregoing procedure avoids the slower processing speed as would be occasioned by the use of more complex software for the exception handlers as required those handlers to handle or otherwise account for the remaining atoms in the molecule and permit them to be presented for execution to their respective functional units. Generally speaking, based principally on hardware, the control information pipeline provides a fast and efficient means to permit reassertion of a VLIW molecule in the instruction pipeline, while permitting software, the exception handler, to control whether individual atoms within a molecule are executed by the respective functional unit.

In addition to exceptions, other out-of-the ordinary actions, similar in effect to exceptions, are found to occur from time to time in the execution of instructions that also may slow down the speed of processing. One of those actions is a multi-cycle operation that requires multiple cycles of operation to complete. The present invention deals with those events in a new way that also makes use of a synchronized control information pipeline.

During the run of a software program circumstances are encountered when it is necessary for an instruction (herein referred to as a multi-cycle instruction) to stall the processor while the instruction performs some multi-cycle operation. A multi-cycle operation requires more than one machine cycle to complete. One common multi-cycle operation, as an example, is an input—output operation and, thereby, involves a peripheral device. By merely initiating the input-output operation, the peripheral device may be prompted to perform some action, and that action will continue, even if the processor tries to interrupt the multi-cycle operation. That could produce erroneous result, which is obviously unacceptable.

For that kind of operation, it is possible for each functional execution unit to maintain "state" that is synchronized to the instruction pipeline. And that requires greater circuit complexity for those units, and in turn increases the chance for errors to occur.

The present invention takes advantage of and adapts the foregoing control information pipeline hardware and software technique that links one or more bits (sometimes referred to as "help bits") to atom instructions to mark, annotate or tag, as necessary, atom instructions with control information that allows more efficient handling of a multi-cycle operation, thereby further enhancing the efficiency of processing operations.

As an advantage the invention permits VLIW computers, such as those constructed in accordance with the '205 Kelly patent, to gain in performance without increasing the complexity of the hardware or software. As a further advantage, the invention permits continued reassertion of a VLIW instruction (molecule) containing a multi-cycle atom without re-executing other atoms in the molecule.

Accordingly, an object of the invention is to improve the internal operating efficiency of a microprocessor, more particularly, a VLIW microprocessor.

And another object of the invention is to provide a new more efficient process and apparatus internal to a VLIW microprocessor for handling those atoms in a molecule (VLIW instruction) that call for execution of an operation that requires multiple machine cycles to complete.

SUMMARY OF THE INVENTION

In accordance with the invention, a processor includes an instruction pipeline, a control information pipeline and a pipeline control unit that operates the instruction pipeline and the control information pipeline in synchronism. The pipeline control unit originates a packet of help bits, and contains the means for appropriately marking and introducing the help bits in the control information pipeline when an instruction is asserted, whereby both the instruction and help bits progress through the respective pipeline stages in synchronism. At the execution stage of the pipeline, respective execution units interpret those help bits, and function in accordance with that interpretation.

In a more specific aspect to the invention the help bits signify a multi-cycle operation, specifically, whether a reasserted multi-cycle atom calls for execution of the second part of a multi-cycle operation.

As an advantage, a processor may be modified to include multiple control information pipelines to serve separate and distinct control operations. As an example, the foregoing control information pipeline may be combined in a single processor with the "enable bit" control information pipeline described in my copending application.

The foregoing and additional objects and advantages of the invention together with the structure characteristic thereof, which was only briefly summarized in the foregoing passages, becomes more apparent to those skilled in the art upon reading the detailed description of a preferred embodiment of the invention, which follows in this specification, taken together with the illustration thereof presented in the accompanying drawings.

DETAILED DESCRIPTION OF THE PREFERRED EMBODIMENT

Figure 1:
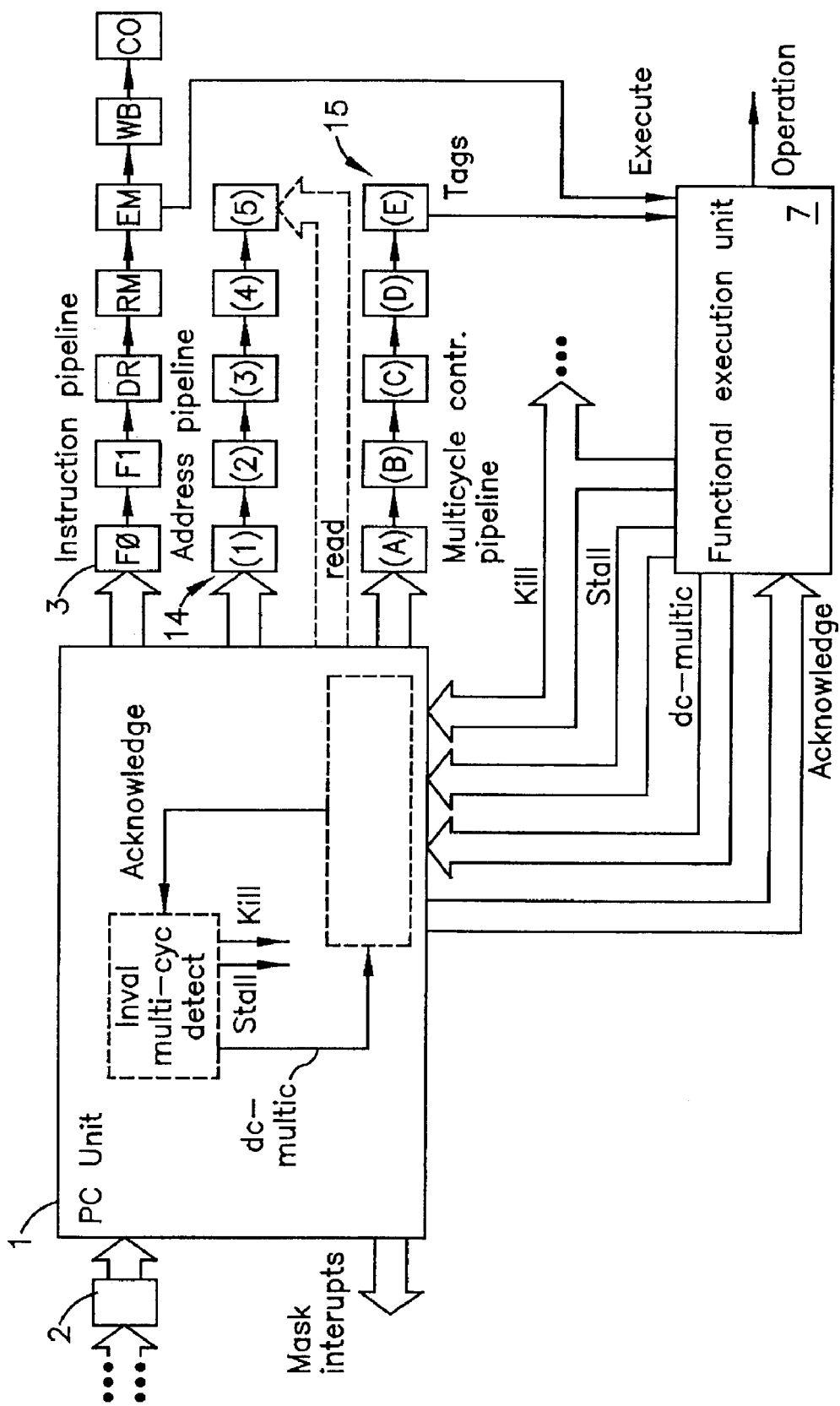
FIG. 1 illustrates an embodiment of the invention that processes multi-cycle operations.

Reference is made to FIG. 1 which is a simplified functional block diagram of an embodiment of the invention to handle multi-cycle operations. The figure is a partial illustration of the microprocessor of a VLIW computer, presenting only the internal elements of a processor material to assertion and execution of instructions. Those elements include the pipeline control (PC) unit 1, the VLIW instruction pipeline 3, an address pipeline 14 and a functional execution unit 7, being representative of either of the memory unit or floating point units of the processor, both of which may be modified to incorporate the present improvement.

In addition to the instruction pipeline 3 and address pipeline 14, the processor also includes a sideband or pipeline 15, sometimes referred to herein as a multi-cycle control information pipeline. That control information pipeline may be constructed as a five-stage series of shift registers (flip-flops). Pipeline 15 carries the tags or help bits. That pipeline is controlled by pipeline control unit 1, as herein more fully described. In practice all pipelines are found within the pipeline control unit, and are illustrated as separate from that unit to aid understanding of the invention.

Multi-cycle control information pipeline 15 should be recognized as being new to VLIW processors, and is a distinguishing hardware feature to the invention. As becomes apparent hereafter, the implementation of the invention also requires minor hardware modification to the memory and floating point units and the pipeline control unit, and minor software modifications to accomplish the functions as hereinafter more fully described.

Instruction pipeline 3 contains five principal stages, designated F0, F1, DR, RM, and EM. Stage F0 represents the first part of the fetch process in which the instruction is fetched from a memory, not illustrated, using the instruction (memory) address introduced into the pipeline; stage F1 is the second part of the fetch for that instruction; DR represents a decode stage (or, for a different type of atom, a register read); RM represents the register read stage (or, for a different type of atom, a cache 0 stage); and EM represents either the execution stage or a cache 1 stage, a floating point execute, or a media execute stage.

Two additional stages designated WB, write-back and CO, commit, are optional, but are desirable operations, such as described, as an example, in the particular VLIW processing system described in the '205 Kelly patent. The later two optional stages are sometimes combined into a single stage of the pipeline. Though briefly noted, the function of those optional stages is not relevant to the invention.

The instruction pipeline depicted is actually a composite of the several different instruction pipelines in the processor, each associated with a different execution unit. Each operation such as add, load, branch, shift is specified by an atom, which has a format that resembles a typical RISC instruction and multiple atoms are packed in a molecule. The individual pipelines permit the multiple independent operations (atoms) contained in a molecule to execute in parallel.

In a practical embodiment of a VLIW computer, the VLIW molecule may comprise either sixty-four bits or 128 bits in length, and may contain between one to four atoms defining separate operations. By design, one of the atoms may be reserved for a memory operation, while the other atoms in the molecule may be an ALU0, ALU1 and an immediate operation; and any of the other operations available in the processor may be substituted for the ALU1 integer operation within a molecule. Each of the operations in the molecule should require service by a separate mutually exclusive functional unit of the processor. The atoms within a molecule of necessity must be such as to execute in different functional units, so as to avoid a conflict that shuts down the processor. The instruction format to which the computer programmer must adhere, ensures that atoms in a molecule use distinct functional units.

When an instruction (molecule) containing four independent atoms is entered into the instruction pipeline (as an address), the atoms, being directed to different functional units within the processor, are routed into the appropriate pipeline associated with the respective functional unit. Those separate atoms progress along the respective pipelines, step by step, essentially in tandem. Typically, the initial two fetch steps are common to all the atoms, hence, the several different pipelines employ the same two stages and diverge to the various functional units following the second stage. The respective functional units perform instruction execution at the fifth stage.

Address pipeline 14, constructed of a multi-stage multi-bit series of shift registers, is included within PC unit 1. This pipeline contains five-stages (1) through (5), paralleling (and mimicking the progression on the F0 through EM stages of instruction pipeline 3. The address pipeline carries the VLIW instruction address, step by step, down the pipeline in synchronism with the advancement of the VLIW instruction retrieved into the instruction pipeline 3. That movement or transfer of digital address information from one stage to another is controlled by the processors PC unit 1.

The address pipeline provides protection against loss of the instruction (molecule). The instruction is initially fetched from the address asserted in the instruction pipeline in the initial pipeline stages. If for any reason an exception (or other out-of-the ordinary event) occurs in the instruction pipeline that results in the loss of the instruction, the PC unit 1 is able to retrieve the instruction address from the address pipeline and simply retrieve the lost instruction at that address in memory for subsequent reassertion. The address pipeline provides a convenient location to access the instruction address required in the operation of the present invention.

The control information tag for the VLIW molecule requires multiple bits, in this embodiment, one bit for each of the functional units of the processor that may "need to know" if a atomic instruction prescribes a multiple cycle operation. Each bit is associated with a respective one of the identified functional units and can be read only by that unit. A single bit is sufficient to communicate the necessary multi-cycle operation information. That bit may be disabled ("0"), which is the default value, and is set enabled ("1") when it is desired to execute (indicate) the second half of the multi-cycle operation in the associated VLIW atomic instruction.

In a practical embodiment control information pipeline 15 is three bits wide. Each bit position in that pipeline (and, hence, the control information bit in the respective position) are assigned, respectively, to distinct functional units of the processor. In this embodiment, the bit positions (and bits) are assigned to the floating point unit and to the memory unit (collectively illustrated by block 7), both of which are functional execution units of the processor, and to pipeline control unit 1.

Each of the foregoing execution units and the pipeline control unit includes an output dedicated to signaling detection of an atomic instruction that requires multiple machine cycles in which to complete operation. The output of each unit may be identified by individual names to identify the source. As examples of such names, "dc_multic" is from the memory unit to the pipeline control unit, "fg_multic" from the floating point unit, and "pc_multic" from the pipeline control unit. To avoid unnecessary repetition in this description, the name "dc-multic" is used generically for any of the sources. The pipeline control unit contains an input dedicated to receiving the dc_multic signal when outputted from either of the floating point unit or the memory unit and also contains an internal input for receiving such kind of signal when generated internally by other portions of the internal logic of the pipeline control unit. The pipeline control unit also contains an acknowledgment (signal) output for replying (signaling) to both the floating point unit and the memory unit that it is safe for the particular one of those execution units that issued the "dc-multic" signal to proceed with the multi-cycle operation (and another for acknowledging an internally generated multi-cycle request). The "dc-multic" signals may be thought of as multi-cycle request signals, while the reply signals from the pipeline control unit may be thought of as an acknowledge.

The more detailed description of the logic and other circuitry in each part and their function is best understood from a consideration of the multi-cycle operation, which follows. In operation, the pipeline control unit obtains a VLIW instruction, more specifically, a VLIW instruction address 2, and asserts that address in instruction pipeline 3, and also into the address pipeline 14.

The pipeline control unit also concurrently issues a packet of the control information (help) bits, which in this embodiment is three bits wide, into the multi-cycle information control pipeline 15. Those help bits are included with each and every VLIW instruction that is issued (or reissued) into the instruction pipeline. However, upon initial issuance of the instruction the pipeline control unit sets all the multi-cycle help bits as FALSE or disabled ("0"), and thereby has no effect on non-multi-cycle atoms.

Under control of the PC unit the instruction (molecule) progresses through the various stages of the instruction pipeline, and, in synchronism therewith, each of the VLIW address and the multi-cycle control information bits advance down their respective pipelines.

As those skilled in the art appreciate, the VLIW instruction ("molecule") referred to is a VLIW instruction address. The first two stages (F0 & F1) of the instruction pipeline are the fetch operations in which the molecule is fetched from the specified address in memory. When the molecule reaches the execution stage (EM) each atom within the molecule appears at a respective functional unit for execution. Recalling that the instruction pipeline illustrated represents a composite of multiple parallel pipelines, one for each functional execution unit in the processor, and that the multiple atoms within the molecule may only access separate non-conflicting ones of those functional execution units, the individual atoms of the molecule are present for execution by respective separate functional units.

When an atom is presented at the execution stage EM of the pipeline for execution, the execution unit for that atom determines whether the atom is for an operation that requires multiple machine cycles to complete, sometimes herein referred to as a multi-cycle atom. A short interval of time exists in the execution stage (about one-half clock cycle), in which, prior to any possible execution, the functional units, including the memory unit and the floating point unit, make ready for execution, an interval referred to as the first part of the EM stage. During that interval, the functional units each determine, for one, whether a respective atom will cause an exception and/or is for a multi-cycle operation.

A variety of mechanisms are known that may be used to detect if an instruction (here an atom) of a software program specifies a multi-cycle operation. Memory operations directed to input-output space are usually indicated by opcode bits in the instruction or by bits in the translation look-aside buffer (TLB) that indicate a region of memory is uncached (sic not permitted to be cached) which is characteristic of memory-mapped I/O space. Multi-cycle floating point operations are indicated by a combination of the type of instruction being executed and the specific floating point data being processed. Multi-cycle operations in the pipeline control unit are all determined by the instruction opcode, i.e. Some instructions always define a multi-cycle operation, while other instructions never define multi-cycle operations.

For this description one of the atoms in the molecule is presumed to require multiple cycles to complete, and, further, is also presumed to be a memory atom. Further, it is assumed that the atom was not determined by the memory unit to be subject to an exception (and that no other functional execution units generated an exception to their respective atoms). Memory unit 7 thus determines that the atom is a multi-cycle atom.

When a functional unit detects a multi-cycle operation (or an exception or the like) it asserts a global kill signal. That kill signal signals all functional units that any pending instructions should not be permitted to complete. That also clears the instruction pipeline of all instructions en route to the execution stage, and effectively halts all other functional execution units in the processor. It should be realized that each functional execution unit acts independently, and are coordinated by the pipeline control unit. Thus, individual execution units do not know whether or not any of the other execution units are generating exceptions. Moreover, more than one execution unit is able to assert a global kill signal simultaneously.

For a multi-cycle operation, the functional unit, here the memory unit, also asserts a stall signal and a multi-cycle request signal, such as the "dc-multic". The stall signal is sent to the pipeline control unit and stalls the pipelining operation of the pipeline control unit. The remaining functional units continue to await new instructions to enter the pipeline, but the pipeline control unit cannot issue new instructions until the stall signal has been released by the originating functional unit. On receiving the stall signal, pipeline control unit 1 reads the instruction address from the fifth stage of address pipeline 14 and stores the address in an internal register, not illustrated. PC unit 1 recognizes the dc-multic signal of the memory unit as a request for initiation of a multi-cycle operation.

As earlier noted, once a multi-cycle operation begins it must not be interrupted until it has been completed, otherwise false data is generated. To prevent any interference with the multi-cycle operation, the pipeline control unit gives precedence to any exceptions as may have been generated by the atom (or any other atoms) or any interrupts as may have occurred. The pipeline control unit must resolve those exceptions (and/or) interrupts before issuing an acknowledge signal (to proceed) to the memory unit.

If, however, the instruction is found subject to an exception or produces an interrupt or if any other execution unit of the processor contains an instruction that is found subject to an exception or produces an interrupt, the handling of any such exception or interrupt takes precedence over the multi-cycle operation. Accordingly, any such exception or interrupt is handled by the pipeline control unit of the processor employing the appropriate exception and/or interrupt handlers, such as was earlier herein described and as described in the '205 Kelly patent and in later patents and applications improving thereon, the details of which are not necessary to the understanding of the present invention.

Pipeline control unit I thus may issue either an "acknowledgment" signal to memory unit 7, effectively signaling an "all clear" to the memory unit, or the unit will fail to timely issue that acknowledgment. Multi-cycle requests are denied only due to pending exceptions and interrupts, and the service of exceptions and interrupts takes precedence over a multi-cycle operation. If the unit does not timely issue the acknowledge signal for the foregoing reason, denying the multi-cycle request, the memory unit releases the multi-cycle operation request (dc-multic) and stall signals, and the multi-cycle operation cannot be performed at that time. Once those exceptions and/or interrupts have been resolved, however, the pipeline control unit reissues the molecule (instruction) containing the multi-cycle atom, and the procedure previously described repeats. However, when the multi-cycle atom is detected this next time at the execution stage, the multi-cycle request is acknowledged.

Thus the pipeline control unit issues the acknowledgment, in one case, immediately, and in the other case following service of an exception or interrupt and reassertion of the molecule containing the multi-cycle atom. The memory unit, having retained the multi-cycle atom, by design then performs the first part of the operation prescribed by the multi-cycle atom. As an example, the memory unit sends the first part of the retrieved data to an input-output peripheral, not illustrated.

The pipeline control unit (either contemporaneously with the foregoing steps or subsequently) then gates through a voltage high to the three bit positions that form the packet of control information in this embodiment and changes the one of those help bits associated with the memory unit (one of the three bits) from DISABLE ("0") to ENABLE ("1"), leaving the remaining help bits, associated with the other functional units, unchanged at the default value, DISABLE. As an example, assume that the help bit that is associated with the memory unit is located at the second bit position in the group of bits. That bit is now set to "1", while the other bits remain "0". By changing the state of the bit to ENABLE the memory atom, the atom is now tagged or marked as a multi-cycle operation and, upon reassertion of the revised control information with the reasserted molecule, indicates that the multi-cycle atom is on its second consecutive "trip" down the instruction pipeline.

That bit ENABLE is interpreted by the memory unit to require the second part of the multi-cycle operation upon execution of the atom and prevents the execution unit from again stalling the pipeline or issuing a multi-cycle request signal on the second presentation of the multi-cycle atom.

The pipeline control unit then retrieves the address of the molecule, earlier retrieved from the address pipeline and stored, and reissues that address into the instruction pipeline 3 and in the address pipeline. At this juncture the memory unit removes the stall signal so that pipelining may resume. Concurrently, the unit also issues the help bits into the multi-cycle control information pipeline 15.

At this juncture, it is recalled that all exceptions as may have been caused by any atom within the molecule on the initial transit through the instruction pipeline have previously been resolved, and should therefore not reoccur when the molecule is at the execution stage of the pipeline. However, interrupts can occur at any time (are asynchronous). Hence, it is important to mask against potential interrupts to prevent such from conflicting with completion of the second part of the multi-cycle operation. Accordingly the pipeline control unit issues a signal ("interrupt mask") to prevent any interrupts that might occur at random from disrupting the execution of the multi-cycle operation.

When the reissued molecule reaches the pipelines execution stage this second time, memory unit 7 checks the multi-cycle atom presented for execution. Upon determining that the multi-cycle help bit is marked ENABLE, the memory unit executes the second part of the multi-cycle operation called for by the atom. The other atoms in the molecule are also executed at this time by their respective functional execution units. With the multi-cycle operation completed (and all other atom instructions executed), regular processing of other application instructions continues.

It should be noted that not all multi-cycle operations will contain a second part to their operation. Although characterized as a multi-cycle operation, the only purpose of the help bit is to tell the respective execution unit on the second reissue of the instruction to do nothing, because the atom has completed its operation.

Since the preferred embodiment of the invention is intended for application as part of a VLIW computer, such as that disclosed in the cited '205 Kelly patent and improvements thereof, it should be recognized that the foregoing multi-cycle operation may occur in multiple atoms normally contained within a molecule. It should be appreciated that multiple multi-cycle requests from different functional execution units can be made, acknowledged and be performed simultaneously (in parallel). They can also be performed serially if desired. For the latter, an instruction might be issued into the pipeline a number of times before finally completing. The help bits are cumulative, so once a multi-cycle operation completes, that atom will have its associated help bit set to "1" until the instruction completes.

The memory unit was used as an example in the foregoing description of operation. The floating point unit operates in the foregoing system in the same manner as described for the memory unit, and, hence, need not be repeated.

From time to time, the pipeline control unit will find it necessary to issue an instruction that invalidates a line from the cache (an INVAL instruction), which is also a multi-cycle operation and is issued twice. When the pipeline control unit detects an INVAL instruction, the pipeline control unit asserts the "kill" signal and then issues a multi-cycle operation request signal ("pc_multic"). If that request is acknowledged by the appropriate logic within the pipeline control unit, the pipeline control unit stalls the pipeline, and accesses the instruction cache to invalidate the appropriate cache line. Thereafter the control unit removes the stall signal, reissues the instruction containing the INVAL atom into the instruction pipeline, sets ("1") the multi-cycle "help" bit for that atom and asserts that into the control information pipeline to propagate there along in synchronism with the foregoing atom. When the INVAL atom enters the execution stage this time, the pipeline control unit detects that the multi-cycle help bit is set, and hence, that the INVAL instruction was earlier completed. Accordingly, the pipeline control unit does not assert the kill signal or request another multi-cycle operation.

The foregoing was described separately from the invention described in my copending application for patent earlier cited. As those skilled in the art will realize from reading the foregoing description, the present invention may be combined (as the applicant intends) together in a single VLIW microprocessor to realize the benefit of both such inventions.

As earlier described, the invention is preferably employed with the "enable bit" invention of my copending patent application, and the latter uses an enable bit control information pipeline constructed of essentially the same types of electronic circuits that are used for control information pipeline 15. Should additional controls be desired for other types of atoms, additional control information pipelines may be added to the processor, along with the additional modifications to some execution units of the processor and the logic of the pipeline control circuit. The foregoing is generally illustrated in FIG. 2 to which reference is made.

Figure 2:
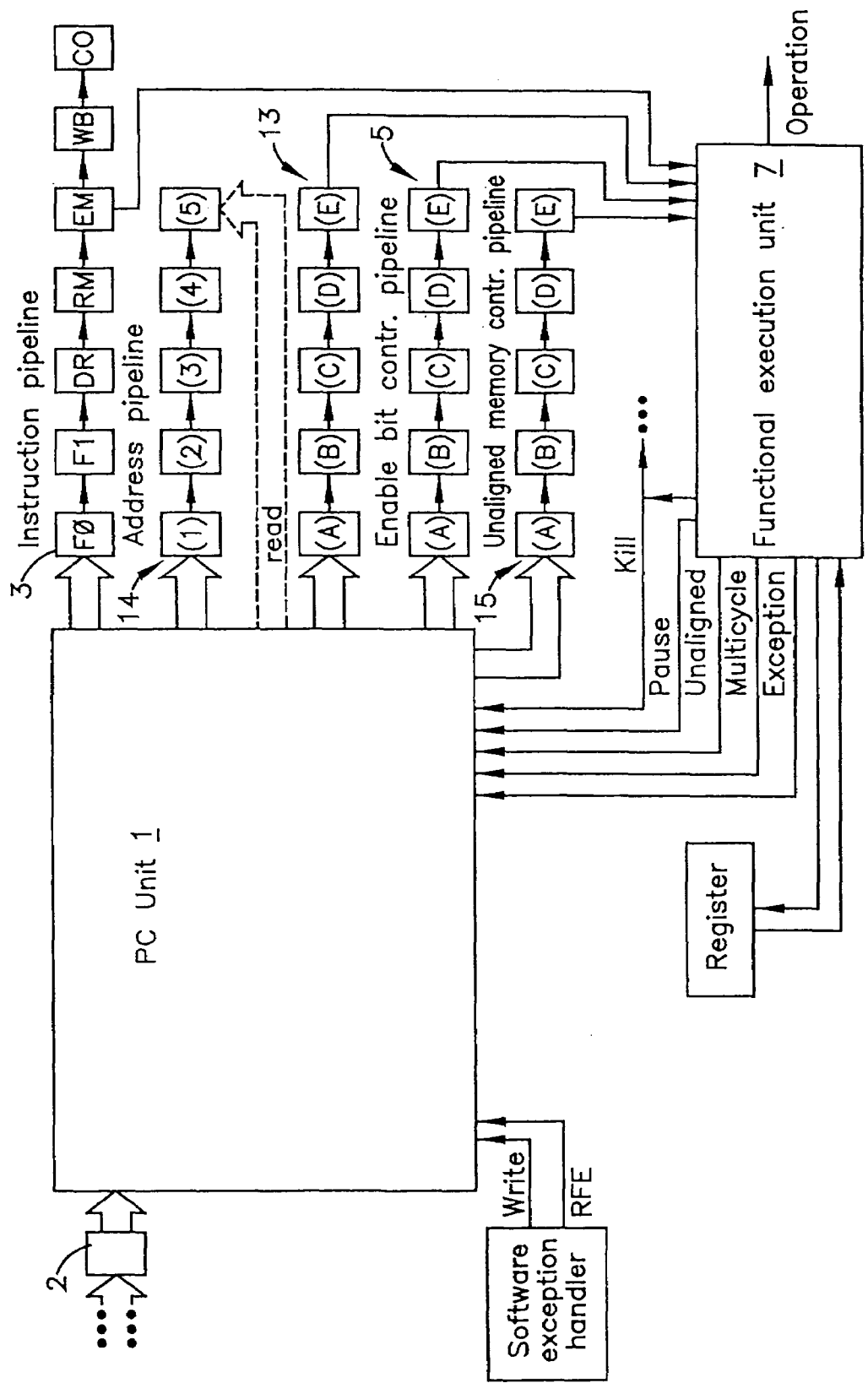
FIG. 2 illustrates a processor embodiment that incorporates the embodiment of FIG. 1 in combination with the improvements of the invention described in my copending application.

FIG. 2 illustrates in a functional block form the pertinent parts of a microprocessor in which the control information pipeline of FIG. 1 and an "enable bit" control information pipeline 13 are included together in the processor. For convenience the same numbers that were used to identify the elements as they appeared in FIG. 1 are used to identify those elements in this figure. However, for this figure functional execution unit 7, is representative of the group of execution units contained in the microprocessor, and that group includes the memory unit used in FIG. 1. Other elements and signals not illustrated in FIG. 1 are described in my copending applications, and do not require additional description, since the figure is intended only to illustrate inclusion of additional control information pipelines in a single microprocessor. In addition to the individual control information pipelines for the enable bits and for the multi-cycle bits, the processor may be expanded to include additional individual control information pipelines 15 and the controls for that pipeline.

As those skilled in the art recognize from an understanding of the invention, the unique means (and manner) described for handling an multi-cycle operation by double assertion of the instruction, places all the control information in one place within the pipeline control unit. Individual functional units are not required to maintain state, and state information is not spread out between multiple functional units. The described structure offers an easier and more safe method of processing multi-cycle operation.

The control information sideband or pipeline for the multi-cycle operation "help" bits was described as being physically separate from the instruction pipeline. However, as recognized from an understanding of the invention, physical separation in hardware is not required to practice the invention. It should be realized that the foregoing sideband may be integrated within the instruction pipeline to define a new or expanded instruction pipeline, which is equivalent in all respects to the separate pipelines described in the illustrated embodiment. An instruction pipeline contains a series of registers that are used to hold instruction information at each stage of the pipeline; and that information is transferred from one register to a succeeding register. By employing larger registers, if available, in that instruction pipeline, large enough to accommodate, as an example, the additional help bits, those help bits can be placed within and moved along the pipeline in synchronism with the instruction just as when separate hardware is used. It should thus be understood that the invention does not require separate hardware for the individual pipelines.

A particular aspect of terminology should be clarified to possibly assist those less skilled in the art in interpreting the foregoing specification and the claims which follow. When a person skilled in the computer art states that the processor control unit asserts an instruction in the instruction pipeline, what is actually placed in that pipeline is the address of the desired instruction into the pipeline. The first and second stages of the pipeline, the fetch stages, use that address to fetch the instruction from the specified address in memory and apply the instruction to the succeeding stages of the pipeline, which ultimately leads to the pipeline execution stage at which the instruction is executed. In that context, a statement that a processor unit is asserting an instruction into the pipeline is synonymous with placing the instruction address into the instruction pipeline.

The meaning is similar when employed in describing a VLIW processor, in which a plurality of individual instructions, called atom instructions or atoms, are grouped together into a molecule, which are asserted in parallel in the VLIW pipeline. Those atom instructions are, ideally, executed in parallel by respective execution units. Thus, when it is said that a molecule (or an instruction) is asserted in the pipeline, what is actually asserted is the address of that molecule. In the fetch stages of the pipeline the molecule, the collection of individual instructions packed together, is retrieved at the specified address for advancement in the pipeline to the execution stage.

Further, one recognizes that some portions of the foregoing detailed description was presented in terms of symbolic representations of operations on data bits within a computer. Those descriptions and representations are the means used by those skilled in the data processing arts to most effectively convey the substance of their work to others skilled in the art. The operations are those requiring physical manipulations of physical quantities. Usually, though not necessarily, those quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and were merely convenient labels applied to these quantities.

Additionally, the manipulations performed were often referred to in terms, such as interpreting, determining, reading and writing, which are commonly associated with mental operations and actions performed by a human. No such capability of a human operator is intended or desirable in any of the operations that were described herein, which form part of the present invention. The operations are machine operations. Useful machines for performing the operations of the present invention include general purpose digital VLIW computers or other similar devices. In all cases the distinction between the method operations in operating a computer and the method of computation itself should be borne in mind. As those skilled in the art recognize the present invention related to a method and apparatus for operating a computer in processing electrical or other (e.g. mechanical, chemical) physical signals to generate other desired physical signals.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A method of processor execution of a very long instruction word (VLIW) molecule, the VLIW molecule including a multi-cycle atom whose execution requires a multiple cycle operation, the processor containing a pipeline and a pipeline control unit, the method comprising:

notifying the pipeline control unit that a multi-cycle atom has been presented for execution and flushing VLIW instructions related to the multi-cycle atom from the pipeline without flushing at least one VLIW instruction not related to the multi-cycle atom from the pipeline, wherein the multi-cycle atom specifies a multi-cycle operation requiring multiple cycles to be completed by a functional execution unit without interruption and wherein the notifying is performed by at least one of a plurality of functional execution units operable to detect a multi-cycle atom, and responsive thereto, for producing a kill signal;

copying an address of the VLIW molecule containing the multi-cycle atom;

executing the multi-cycle atom to complete a first part of the multi-cycle operation;

marking a copy of the address of the VLIW molecule with an indicium indicative of a second part of the multi-cycle operation;

asserting a marked copy of the address of the VLIW molecule into the pipeline to reassert the multi-cycle atom for execution by the functional execution unit; and detecting any marked indicium on the multi-cycle atom when presented for execution and executing the multi-cycle atom in accordance with the respective indicium marked thereon to perform a second part of the multi-cycle operation.

2. The method defined in claim 1, wherein the functional execution unit is operable to produce a stall signal to the pipeline control unit, and further operable to produce a multi-cycle request signal.

3. The method defined in claim 2, wherein the functional execution unit is responsive to an authorization signal from the pipeline control unit and is further operable to perform the first part of a multi-cycle operation of a multi-cycle atom present for execution.

4. The method defined in claim 3, wherein the pipeline control unit is operable to detect a stall signal to pause the pipeline when the pipeline has been cleared of VLIW instructions related to the multi-cycle operation, the pipeline control unit is responsive to the multi-cycle request signal from a functional execution unit, and wherein the pipeline control unit is further operable to detect a multi-cycle request signal from a functional execution unit.

5. The method defined in claim 4, wherein the pipeline control unit is operable to: send an authorization signal to a functional execution unit that sent a multi-cycle signal to permit the functional execution unit to execute the first part of the multi-cycle operation, mark a respective bit associated with the multi-cycle atom within a plurality of control information to indicate the second part of a multi-cycle operation, reassert the VLIW molecule in the instruction pipeline following sending of the authorization signal, and assert the revised control information in the control information pipeline concurrently with the reassertion of the VLIW molecule.

6. The method defined in claim 1, further comprising:

awaiting an authorization to proceed with execution from the pipeline control unit, wherein executing the multi-cycle atom to complete a first part of the multi-cycle operation comprises receiving the authorization and executing the first part of the multi-cycle operation.

7. A very long instruction word (VLIW) processor for processing instructions, comprising:

a plurality of functional execution units operable to execute different operations, wherein atoms within a VLIW instruction are executed in parallel;

an instruction pipeline comprising multiple stages comprising an execution stage;

a pipeline control unit for asserting VLIW instructions into the instruction pipeline and for concurrently inputting a plurality of control information for a plurality of atom instructions within the VLIW instruction into a control information pipeline, wherein the control information pipeline comprises multiple stages for storing control information pertaining to each atom of the VLIW instruction, wherein the instruction pipeline and the control information pipeline are operated in synchronism to advance control information through the multiple stages of the control information pipeline to link the control information to the atoms of the VLIW instruction, and wherein the instruction pipeline is configured to flush VLIW instructions related to a multi-cycle atom operation upon detection of the multi-cycle atom operation without flushing at least one VLIW instruction not related to the multi-cycle atom operation from the instruction pipeline, wherein a presence of a multi-cycle atom is detected by a functional execution unit which produces a kill signal.

8. The processor of claim 7, where the plurality of functional execution units are operable to produce a stall signal to the pipeline control unit and operable to produce a multi-cycle request signal.

9. The processor of claim 7, wherein the pipeline control unit is operable to detect a stall signal to pause the instruction pipeline when the instruction pipeline has been cleared of all VLIW instructions related to the multi-cycle atom.

10. The processor of claim 9, wherein the pipeline control unit is operable to detect a multi-cycle request signal from a functional execution unit.

11. The processor of claim 10, wherein the pipeline control unit is responsive to the multi-cycle request signal from a functional execution unit and is further operable to send an authorization signal to the functional execution unit that sent the multi-cycle signal to permit the functional execution unit to execute a first part of the multi-cycle atom operation.

12. The processor of claim 11, wherein the pipeline control unit is operable to: mark a respective bit associated with the multi-cycle atom within a plurality of control information to indicate a second part of a multi-cycle operation, reassert the VLIW molecule in the instruction pipeline subsequent to sending the authorization signal, and assert revised control information in the control information pipeline concurrently with reassertion of the VLIW instruction.

13. The processor of claim 8, wherein each of the plurality pipeline control units is responsive to an authorization signal from the pipeline control unit and operable to perform a first part of a multi-cycle operation of a multi-cycle atom present for execution.

14. The processor of claim 7, wherein the control information comprises a plurality of bits, each being associated with a respective one of the plurality of functional execution units and the plurality of bits associated with the pipeline control unit.

15. The processor of claim 14, wherein each bit in the plurality of bits may be set ENABLED or set DISABLED and wherein each of the plurality of functional execution units and the pipeline control unit are operable to check and interpret the setting of each of bit in the plurality of bits.

16. The processor of claim 15, wherein one of the plurality of functional execution units executes a second part of a multi-cycle operation of a multi-cycle atom presented for execution based upon one of the plurality of functional execution units interpreting a respective bit of the plurality of bits as ENABLED.

17. The processor of claim 12, wherein the plurality of control information comprises a group of bits comprising a respective bit associated with one of the plurality of functional execution units, wherein each of the bits within the group of bits being indicative of whether an multi-cycle atom operation required by a multi-cycle atom was previously asserted and requires multiple cycles to complete and further indicating the respective functional execution unit to perform the second part of a multi-cycle operation.

18. The processor claim 8, wherein the plurality of functional execution units comprises: a memory unit and a floating point unit.

19. A method of processor execution of a very long instruction word (VLIW) molecule, comprising:
- determining a presence of a multi-cycle atom specifying a multi-cycle operation requiring multiple cycles to be completed by a functional execution unit without interruption;
- notifying a pipeline control unit that a multi-cycle atom has been presented for execution;
- generating a kill signal, wherein the kill signal is generated by the functional execution unit;
- flushing only those VLIW instructions related to the multi-cycle atom from an instruction pipeline;
- copying an address of a molecule containing the multi-cycle atom;
- executing the multi-cycle atom to complete a first part of the multi-cycle operation;
- marking a copy of the address of the molecule with an indicium indicative of a second part of the multi-cycle operation;
- asserting a marked copy of the address of the molecule into the instruction pipeline to reassert the multi-cycle atom for execution by the functional execution unit; and
- detecting any marked indicium on the multi-cycle atom when presented for execution and executing the multi-cycle atom in accordance with the respective indicium marked thereon to perform a second part of the multi-cycle operation.

20. The method of claim 19, wherein the functional execution unit is operable to produce a stall signal to the pipeline control unit and operable to produce a multi-cycle request signal.

21. The method of claim 19, wherein the functional execution unit is responsive to an authorization signal from the pipeline control unit and is operable to perform the first part of a multi-cycle operation of a multi-cycle atom present for execution.

22. The method of claim 19, wherein the pipeline control unit is operable to detect a stall signal to pause the instruction pipeline when the instruction pipeline has been cleared of all VLIW instructions related to the multi-cycle operation, said pipeline control unit responsive to a multi-cycle request signal from a functional execution unit, and wherein the pipeline control unit is further operable to detect the multi-cycle request signal from a functional execution unit.

23. The method of claim 19, wherein the pipeline control unit is operable to send an authorization signal to a functional execution unit that sent the multi-cycle signal to permit the functional execution unit to execute the first part of the multi-cycle operation.

24. The method of claim 19, wherein the pipeline control units are operable to: mark a respective bit associated with the multi-cycle atom within control information to indicate the second part of a multi-cycle operation, reassert the VLIW instruction related to the multi-cycle atom in the instruction pipeline subsequent to sending the authorization signal, and assert revised control information in the control information pipeline concurrently with reassertion of the VLIW instruction related to the multi-cycle atom.

25. The method of claim 19, further comprising:
- awaiting an authorization to proceed with execution from the pipeline control unit, wherein the executing the multi-cycle atom to complete a first part of the multi-cycle operation comprises executing the first part of the multi-cycle operation upon receiving the authorization.

26. A processor for processing instructions, comprising:
- a plurality of functional execution means operable to execute different operations, wherein atoms within a VLIW instruction are executed in parallel;
- an instruction pipeline means comprising multiple stages comprising an execution stage;
- a pipeline control means for asserting VLIW instructions into the instruction pipeline means and for concurrently inputting control information for the atoms within the VLIW instruction into a control information pipeline means,
- wherein the control information pipeline means comprises multiple stages for storing control information pertaining to each atom contained within the VLIW instruction, the instruction pipeline means and the control information pipeline means being operated in synchronism to advance control information through the multiple stages of the control pipeline means to link the control information to the atoms of the VLIW instruction, and wherein the instruction pipeline means is configured to flush VLIW instructions related to a multi-cycle atom operation upon detection of the multi-cycle atom operation without flushing at least one VLIW instruction not related to the multi-cycle atom operation from the instruction pipeline means, wherein each function execution means is operable to detect a presence of a multi-cycle atom and responsive thereto to produce a kill signal, wherein the instruction pipeline means is cleared of VLIW instructions related to a multi-cycle atom operation.

27. The processor of claim 26, where the functional execution means comprises:
- means for producing a stall signal to the pipeline control means and for producing a multi-cycle request signal.

28. The processor of claim 26, wherein the pipeline control means comprises:
- means for detecting a stall signal to pause the instruction pipeline means when the instruction pipeline means has been cleared of all VLIW instructions related to the multi-cycle atom operation.

29. The processor of claim 28, wherein the pipeline control means comprises:
- means for detecting a multi-cycle request signal from a functional execution means.

30. The processor of claim 29, wherein the pipeline control means comprises:
- means responsive to the multi-cycle request signal from a functional execution means and for sending an authorization signal to a functional execution means that sent the multi-cycle request signal to permit the functional execution means to execute a first part of the multi-cycle atom operation.

31. The processor of claim 30, wherein the pipeline control means comprises:

means for marking a respective bit associated with the multi-cycle atom within control information to indicate a second part of a multi-cycle atom operation and for reasserting the VLIW instruction related to the multi-cycle atom in the instruction pipeline means subsequent to sending the authorization signal and for asserting revised control information in the control information pipeline means concurrently with reassertion of the VLIW instruction related to the multi-cycle atom.

32. The processor of claim 31, wherein the functional execution means comprises:

means responsive to an authorization signal from the pipeline control means and for performing the first part of a multi-cycle atom operation of a multi-cycle atom present for execution.

* * * * *